United States Patent
Zeiler et al.

(10) Patent No.: US 10,498,799 B2
(45) Date of Patent: *Dec. 3, 2019

(54) INTELLIGENT ROUTING OF MEDIA ITEMS

(71) Applicant: CLARIFAI, INC., New York, NY (US)

(72) Inventors: Matthew D. Zeiler, New York, NY (US); Keith Ito, New York, NY (US); Adam L. Berenzweig, New York, NY (US)

(73) Assignee: CLARIFAI, INC., New York, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/985,807

(22) Filed: May 22, 2018

(65) Prior Publication Data
US 2018/0270293 A1   Sep. 20, 2018

Related U.S. Application Data

(63) Continuation of application No. 15/002,221, filed on Jan. 20, 2016, now Pat. No. 10,051,036.
(Continued)

(51) Int. Cl.
*H04L 29/08* (2006.01)
(52) U.S. Cl.
CPC ............ *H04L 67/06* (2013.01); *H04L 67/306* (2013.01); *H04L 67/327* (2013.01)
(58) Field of Classification Search
CPC ..... H04L 67/06; H04L 67/327; H04L 67/306; G05B 2219/40554; G05B 2219/40553;
(Continued)

(56) References Cited

U.S. PATENT DOCUMENTS

| | | | | |
|---|---|---|---|---|
| 6,166,729 A | * | 12/2000 | Acosta | ................... H04N 5/232 348/207.99 |
| 7,873,798 B2 | | 1/2011 | Miyazaki | |

(Continued)

OTHER PUBLICATIONS

Non-final Office Action U.S. Appl. No. 15/002,221 dated Nov. 20, 2017.
(Continued)

*Primary Examiner* — Michael Won
(74) *Attorney, Agent, or Firm* — Pillsbury Winthrop Shaw Pittman LLP

(57) ABSTRACT

In certain embodiments, automated routing of media items between user devices may be facilitated. In some embodiments, a routing computer system may automatically obtain images or videos from one or more sources. The routing computer system may perform object recognition on the contents of the images or videos to identify individuals or other objects in the images or videos. The routing computer system may assign first and second images or videos of the images or videos to a first media item group based on (i) the first and second images or videos having similar metadata and (ii) the object recognition identifying an individual or object in the first image or video and an individual or object in the second image or video that are similar to each other. The routing computer system may automatically transmit the first image or video to one or more user devices based on the assignment.

18 Claims, 3 Drawing Sheets

Related U.S. Application Data

(60) Provisional application No. 62/107,021, filed on Jan. 23, 2015.

(58) Field of Classification Search
CPC .......... G05B 2219/40577; G05B 2219/40576; G05B 2219/35074; G05B 2219/35084
USPC ....... 709/201, 202, 203, 219, 229, 230, 232, 709/244
See application file for complete search history.

(56) References Cited

U.S. PATENT DOCUMENTS

| | | |
|---|---|---|
| 8,112,531 B2 | 2/2012 | Walsh |
| 8,688,782 B1 * | 4/2014 | Lin .................. G06Q 30/02 709/203 |
| 2006/0251292 A1 | 11/2006 | Gokturk |
| 2007/0070038 A1 * | 3/2007 | Hoffberg .............. G06F 3/0482 345/156 |
| 2008/0115173 A1 | 5/2008 | Ellis |
| 2011/0208822 A1 | 8/2011 | Rathod |
| 2013/0031208 A1 | 1/2013 | Linton |
| 2013/0036438 A1 * | 2/2013 | Kutaragi ........... H04N 21/2743 725/38 |
| 2013/0276042 A1 | 10/2013 | Savastianov |

OTHER PUBLICATIONS

Non-final Office Action U.S. Appl. No. 15/002,221 dated Oct. 12, 2017.

Notice of Allowance U.S. Appl. No. 15/002,221 dated Apr. 18, 2018.

\* cited by examiner

INTELLIGENT ROUTING OF MEDIA ITEMS

CROSS-REFERENCE TO RELATED APPLICATIONS

This application is a continuation of U.S. patent application Ser. No. 15/002,221, filed Jan. 20, 2016 and entitled "Intelligent Routing of Media Items," which claims the priority benefit of U.S. Provisional Patent Application No. 62/107,021, filed Jan. 23, 2015 and entitled "Intelligent Routing of Media Items," each of which is incorporated herein by reference in its entirety.

FIELD OF THE DISCLOSURE

The present invention relates generally to facilitating the sharing of digital media items between source computing platforms and end computing platforms based on information associated with the media items.

BACKGROUND

Digital media items such as photos, videos, written text, and/or other digital media items may be generated on a frequent basis, by both human users and machines. Users may wish to share the digital media items generated by other users, by machines, and/or by other sources. Organization of media items may be key to allow for efficient access and/or handling of the media items by users who may wish to access one or more of the media items and/or a collection (also referred to as a group) of one or more media items. Organization may be difficult when one or more media items may be edited (e.g., changed in some way) by a user and/or machine, deleted, and/or added to a collection of existing media items.

Information used to organize a collection of media items may include information stored as metadata associated with individual ones of the media items. Metadata and/or other information associated with a given media item may include one or more timestamps, a physical location where the media item was generated, user-generated information, and/or other information. In some embodiments, metadata may be referred to as "labels" and/or "tags" associated with a given media item. However, even with the embodiment of metadata and/or other information associated with individual media items, organization efforts may still fail to meet user expectations. By way of non-limiting example, users desiring to access and/or retrieve one or more media items from a collection of media items may perform metadata keyword searches, but still may have to sift through results to find the most relevant ones.

SUMMARY

One or more aspects of the disclosure relate to a system for facilitating the sharing of media items between source computing platforms and end computing platforms, and/or other locations. Source computing platforms may be associated with human users, automated machines, and/or other considerations. By way of non-limiting example, users of the system may be "subscribers" to, or "members" of, a particular type or types of media items that may be shared by a source computing platform. One or more aspects of the disclosure are related to making media items easy to locate, allowing actions to be triggered automatically (including, but not limited to, automatic routing of a media item to one or more users, generating notifications to one or more users who have indicated interest in a media item and/or media item group, suggesting that a media item be shared with one or more users, and/or other considerations), and/or other features and/or functions. By way of non-limiting example, automatic routing of media items from a source computing platform to an end computing platform may be in response to analyzing metadata associated with the media items, extracting information from the media items, and/or based on other criteria.

In some embodiments, the system may comprise one or more hardware processors configured to execute one or more computer program components. The computer program components may include one or more of a feature extraction component, a grouping component, a routing component, and/or other components.

In some embodiments, the feature extraction component may be configured to obtain one or more digital media items from one or more source computing platforms. Individual ones of the media items may comprise one or more of a photo, a video, an audio file, a text file, and/or other digital media item. In some embodiments, a source computing platform may be associated with one or more of a human user, an automated machine, and/or other source. By way of non-limiting example, a user may provide a media item by "uploading" the media item to the feature extraction component of the one or more processors from a source computing platform over a network (e.g., the Internet).

In some embodiments, a user providing one or more media items via a computing platform may comprise utilizing a user interface presented on the computing platform. The user may upload a media item based on instructions presented on the user interface.

In some embodiments, a computing platform may be configured to provide a media item automatically based on the computing platform (and/or other communicatively coupled device) generating the media item (e.g., automatically and/or based on user input). By way of non-limiting example, a computing platform may be communicatively coupled to a security camera and/or other devices. The computing platform may receive content (e.g., video, audio, and/or images) from the security camera and/or other devices. The computing platform may be configured to communicate (e.g., over a network, such as the Internet) the received content to the feature extraction component automatically in response to the content being generated by the camera, and/or other considerations.

In some embodiments, the feature extraction component may be configured to obtain information associated with individual ones of the obtained media items. The information may correspond to a context of individual ones of the media items, and/or other information. In some embodiments, the obtained information may include information provided with the media items. By way of non-limiting example, obtained information may comprise information stored as metadata provided with a given media item. Metadata and/or other information associated with a given media item may include one or more timestamps, a physical location where the media item was generated, user-generated information, source-generated information, and/or other information. In some embodiments, metadata and/or other information associated with a given media item may be referred to as a "label" and/or "tag" associated with the given media item, and/or other terms.

In some embodiments, the feature extraction component may be configured such that the obtained information comprises information determined from (e.g., extracted from) the media items. By way of non-limiting example, the feature extraction component may be configured to determine information about a given media item based on analyzing content of the media item, and/or other considerations. In some embodiments, the feature extraction component may be configured to determine content of a media item using one or more content extraction techniques. By way of non-limiting example, a content extraction technique may comprise object recognition, word searches, speed recognitions, natural language processing, object detection, music genre classification, and/or other considerations.

In some embodiments, the grouping component may be configured to associate one or more media items with one or more groups based on the obtained information, grouping criteria, and/or other information. Herein, the terms "group" and "collection" may be used interchangeably to generally mean one or more media items that may be related based on similarity. In some embodiments, association may be based on content similarity, contextual similarity, metadata similarity, user-defined similarity, and/or other information.

In some embodiments, the routing component may be configured to communicate the obtained one or more media items, and/or other information (e.g., notifications) to one or more end computing platforms. In some embodiments, the routing component may be configured such that communicating media items and/or other information may be based on a particular group with which a given media item may be associated, a particular group with which a user and/or end computing platform may be associated, a triggered action, and/or other information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

Figure 1:
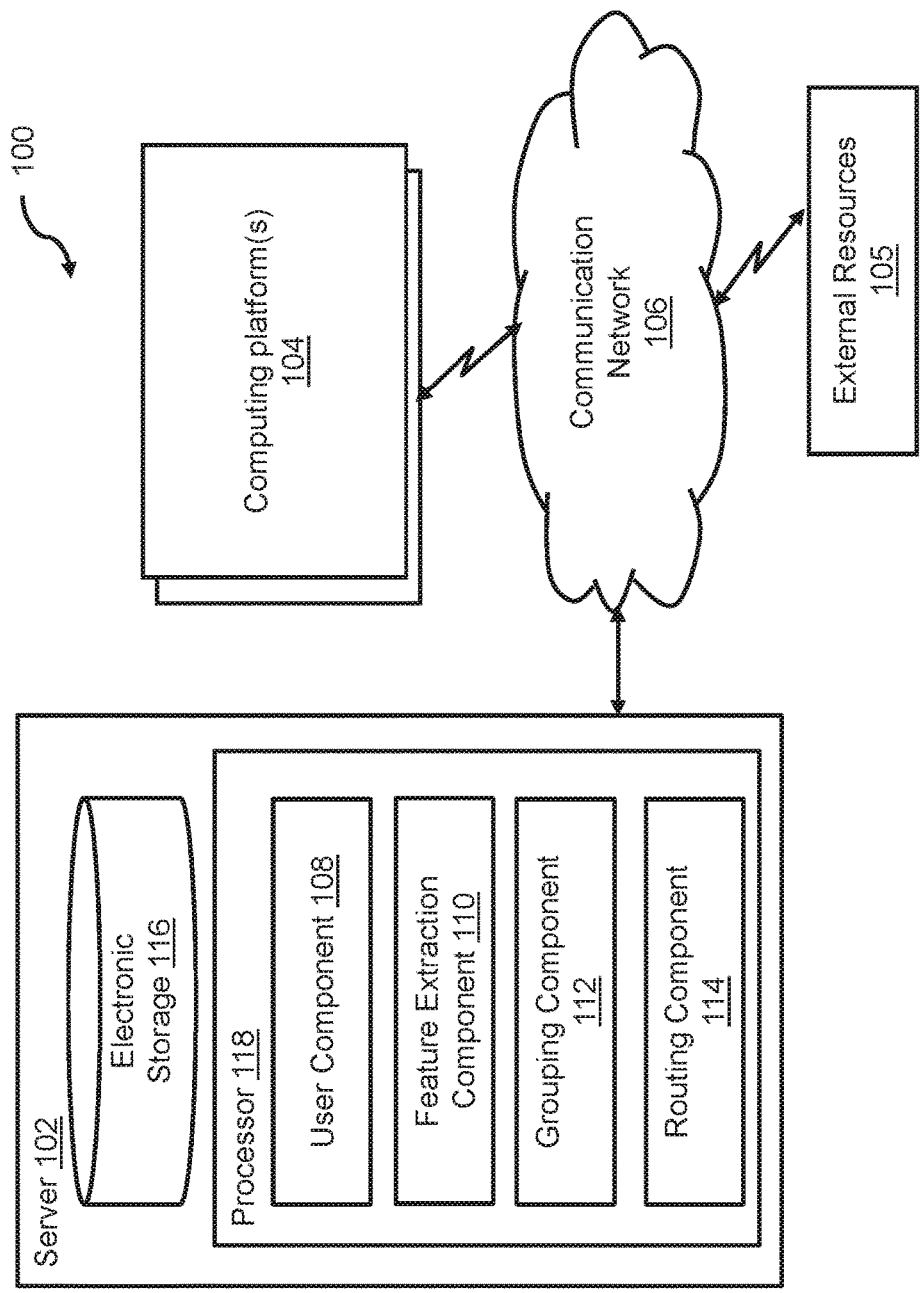
FIG. 1 illustrates a system for communicating digital media items between source computing platforms and end computing platforms based on information associated with the media items, in accordance with one or more embodiments.

FIG. 1 illustrates a system 100 for facilitating the sharing of digital media items between source computing platforms and end computing platforms based on information associated with the media items, in accordance with one or more embodiments. In some embodiments, a source computing platform may comprise one or more computing platforms 104 associated with users, one or more computing platforms 104 that may be automated, an external resource 105, and/or other sources. A given media item may include one or more of a photo (or other image), video, audio, text, web content, combinations thereof, and/or other considerations. In some embodiments, information associated with individual ones of the media items may comprise information stored as metadata associated with the media items. In some embodiments, metadata may be referred to as "labels," "tags," and/or other terms.

In some embodiments, communication of media items between source and end computing platform may be facilitated by communications routed through network 106, server 102, and/or other components of system 100 and/or one or more external entities. By way of non-limiting example, users of the system may be "subscribers" of the system 100. The users may subscribe to a particular type or types of media items that are shared by one or more source computing platforms 104.

In some embodiments, the system 100 may comprise one or more hardware processors 118 configured to execute one or more computer program components. The computer program components may include one or more of a user component 108, a feature extraction component 110, a grouping component 112, a routing component 114, and/or other components.

In some embodiments, the user component 108 may be configured to access and/or manage one or more user profiles and/or user information associated with users of the system 100. The one or more user profiles and/or user information may include information stored by server 102, one or more of the computing platforms 104, and/or other storage locations. The user profiles may include, for example, information identifying users (e.g., a username or handle, a number, an identifier, and/or other identifying information), security login information (e.g., a login code or password), subscription and/or membership information, usage information (e.g., a login history indicating the frequency and/or amount of times the user logs in to the user accounts), demographic information associated with users, interaction history among users, information stated by users, browsing history of users, a computing platform identification associated with a user, a phone number associated with a user, and/or other information related to users.

In some embodiments, subscription and/or membership information managed by the user component 108 may include information indicating media items a user may be interested in, media item groups a user may be interested in, and/or other information. In some embodiments, user interest may be provided by information stated by users (e.g., a user may set up a user profile indicating their areas of interest). In some embodiments, user interest may be derived from user actions and/or other information. By way of non-limiting example, user interest may be derived from a browsing history of the user (e.g., which media items the user searched for and/or viewed for an extended period of time, and/or other considerations), information provided by another user (e.g., a parent and/or guardian may select and/or limit the media items, types, and/or groups that may be available to a child user, and/or other considerations), and/or other information. Subscription and/or membership information may be considered in other ways.

In some embodiments, the feature extraction component 110 may be configured to obtain one or more digital media items from one or more source computing platforms 104. In some embodiments a source computing platform 104 may be associated with one or more of a human user, an automated machine, and/or other source. By way of non-limiting example, a user may provide a media item by "uploading" the media item to the feature extraction component 110 from a source computing platform 104 over the network 106 (e.g., the Internet, and/or other network).

In some embodiments, a user providing one or more media items via a computing platform may comprise utilizing a user interface (not shown in FIG. 1) presented on an associated computing platform 104. By way of non-limiting example, a user may upload a media item based on instructions presented by the user interface. In some embodiments, a computing platform 104 may include one or more media input devices included with, or coupled to, the computing platform 104. By way of non-limiting example, a media input device may include one or more of a document scanner, a camera, a microphone, a port configured to be communicatively coupled to a mobile device (e.g., a digital camera), and/or other considerations.

In some embodiments, a source computing platform 104 may be configured to provide a media item automatically as based on the source computing platform 104 (and/or other communicatively coupled device) generating the media item (e.g., automatically and/or based on user input). By way of non-limiting example, a source computing platform 104 may be communicatively coupled to a security camera and/or other devices. The source computing platform 104 may receive content (e.g., video, audio, and/or images) from the security camera and/or other devices. The source computing platform 104 may be configured to communicate (e.g., over a network, such as the Internet) the received content to the feature extraction component 110 automatically based on the content being generated by the camera and/or received by the source computing platform 104, and/or other considerations. Other embodiments of the system are presented herein below.

In some embodiments, the feature extraction component 110 may be configured to obtain information associated with individual ones of the obtained media items. The information may correspond to a context of individual ones of the media items. In some embodiments, the obtained information may include information provided with the media items. By way of non-limiting example, obtained information may comprise information stored as metadata provided with a given media item. Metadata and/or other information associated with a given media item may include one or more timestamps, a physical location where the media item was generated, user-generated information, source-generated information, and/or other information. In some embodiments, metadata and/or other information associated with a given media item may be referred to as a "label" and/or "tag" associated with the given media item, and/or other terms.

In some embodiments, the feature extraction component 110 may be configured such that the obtained information comprises information determined from the media items. By way of non-limiting example, the feature extraction component 110 may be configured to determine information about a given media item based on content of the media item. In some embodiments, the feature extraction component 110 may be configured to determine content of a media item using one or more content extraction techniques. By way of non-limiting example, a content extraction technique may comprise object recognition, word searches, natural language processing, object detection, music genre classification, speedy recognition and/or other considerations.

By way of non-limiting example, the feature extraction component 110 may be configured to obtain a first media item, and/or other media items. The first media item may be obtained from a first source computing platform. The first source computing platform may be associated with a first user. In some embodiments, the first source computing platform may be associated with a first automated machine.

In some embodiments, the grouping component 112 may be configured to associate one or more media items with one or more groups based on the obtained information, and/or other information. Herein, the terms "group" and "collection" may be used interchangeably to generally mean one or more media items that may be related based on similarity. In some embodiments, association may be based on content similarity, contextual similarity, metadata similarity, user-defined similarity, and/or other similarity between media items in a given group. Grouping may be accomplished in other ways.

By way of non-limiting example, the grouping component 112 may be configured to associate the first media item with a first group and/or other groups. The first group may correspond to one or more media items that may be related based on similarity. By way of non-limiting example, the first group may also include a second media item. The second media item and first media item may be related by a first similarity metric. The first similarity metric may be based on content of the media items, context of the media items, metadata of the media items, user-defined information, and/or other information. By way of non-limiting example, the first and second media items may include metadata indicating a same or similar physical location of content of the media items. The content may be referenced graphically (e.g., in an image and/or video), textually, and/or other considerations. In some embodiments, the first group may be associated with the physical location and/or other similarity metrics.

In some embodiments, the routing component 114 may be configured to communicate the obtained one or more media items, and/or other information to one or more end computing platforms. In some embodiments, the routing component 114 may be configured such that communicating media items and/or other information may be based on a particular group with which a given media item may be associated, a particular group with which a user and/or end computing platform may be associated, a triggered action, and/or other information. By way of non-limiting example, the routing component 114 may be configured to communicate the first media item to a first end computing platform associated with a second user based on the second user being associated with the first group, and/or other considerations. Triggered actions are described in more detail below.

Figure 2:
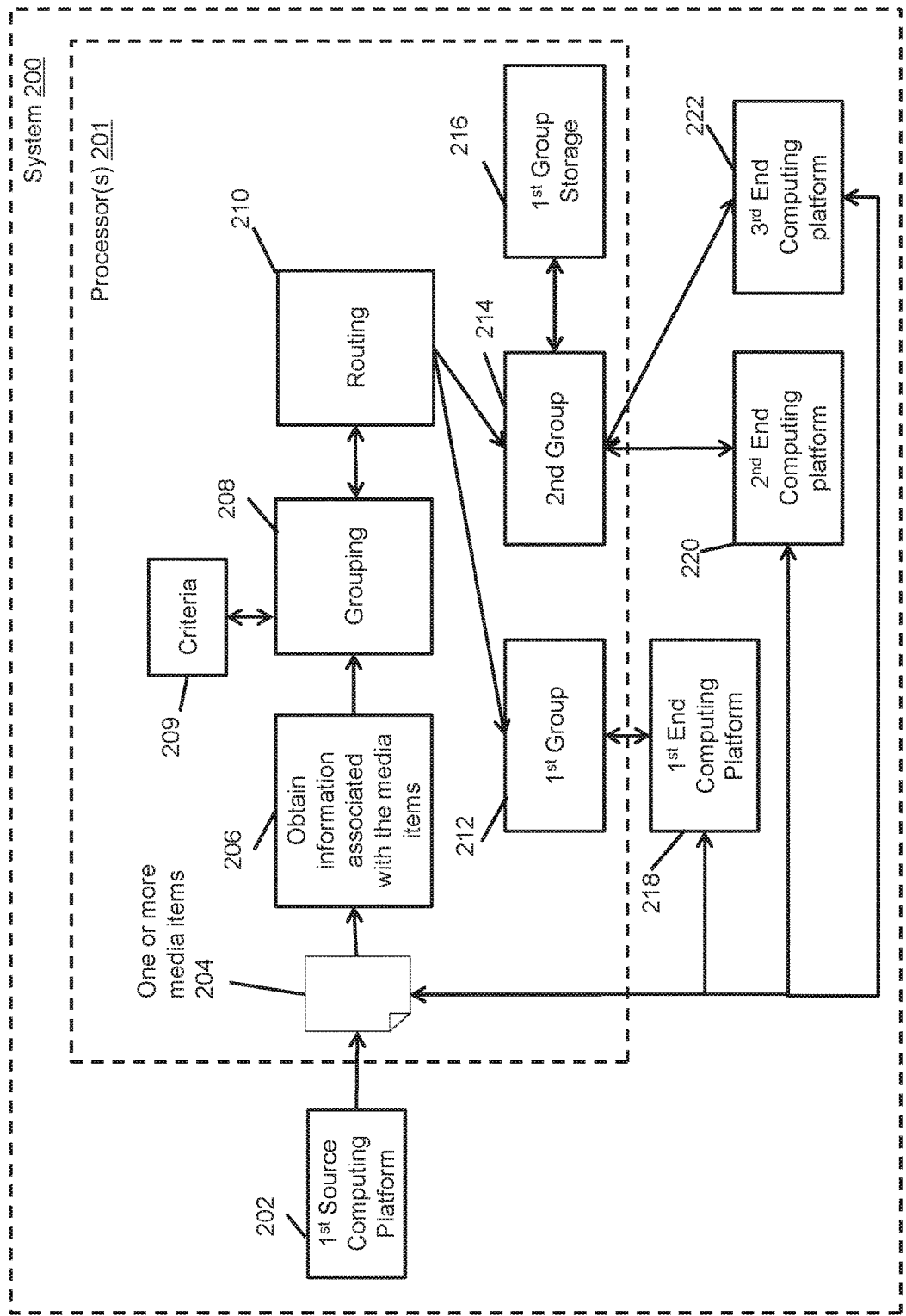
FIG. 2 illustrates a diagram of information flow of a system for communicating digital media items between source computing platforms and end computing platforms based on information associated with the media items, in accordance with one or more embodiments.

FIG. 2 illustrates a diagram of information flow in a system 200 for facilitating the sharing of digital media items between source computing platforms and end computing platforms based on information associated with the media items, in accordance with one or more embodiments. In some embodiments, system 200 may comprise one or more hardware processors 201 configured to execute one or more computer program components (not shown in FIG. 2) to facilitate the communication of information. In some embodiments, the communication of information within system 200 may be facilitated by one or more computer program components the same or similar as computer program components 108-114 (see, e.g., FIG. 1), and/or other components. By way of non-limiting example, system 200 may be the same or similar to system 100 in FIG. 1. In some embodiments, one or more features and/or functions attributed to system 200 may be similarly employed in system 100, and/or vice versa.

Referring now to the diagram in FIG. 2, a first source computing platform 202 may be in communication with the one or more processors 201. By way of non-limiting example, first source computing platform 202 may communicate with processor(s) 201 over a network, such as the Internet and/or other network. The first source computing platform 202 may be configured to communicate one or more media items 204 and/or other information to the one or more processors 201. Information associated with the one or more media items 204 may be obtained 206 at the one or more processors 201. Information may be obtained based on metadata and/or other information associated with the one or more media items 204 being provided with the one or more media items 204, metadata and/or other information determined from the one or more media items 204, and/or other considerations.

In some embodiments, information associated with the one or more media items 204 may include, but is not limited to: one or more users associated with the one or more media items 204; one or more computing platforms associated with the one or more media items 204 (e.g., first source computing platform 204 and/or other computing platforms); one or more locations associated with the one or more media items 204; date(s) and times(s) associated with one or more media items 204; objects, categories, concepts, and/or semantics associated with the one or more media items 204; one or more reasons why the one or more media items 204 may have been created and/or shared; mechanism by which the one or more media items 204 were created and/or used; and/or other information.

In some embodiments, one or more users associated with the one or more media items 204 and/or one or more computing platforms associated with the one or more media items 204 may be determined from information included as metadata associated with the one or more media items 204, and/or other considerations. The metadata may be user generated metadata, first source computing platform 202 generated metadata, and/or other considerations. In some embodiments, the one or more users associated with the one or more media items 204 and/or the one or more computing platforms associated with the one or more media items 204 may be determined based on analysis of the content of the one or more media items 204. By way of non-limiting example, analysis may include one or more of automatic recognition of faces in a photo and/or video, through named entity extraction from text of the one or more media items 204, by analysis of a history of actions a user performed involving the one or more media items 204 (e.g., sending and/or sharing the one or more media items 204 with other user and/or computing platforms), and/or other considerations.

In some embodiments, locations associated with the one or more media items 204 may be determined from information included as metadata associated with the one or more media items 204. Locations and/or other information may include a GPS location, location tags provided by a user, information determined based on analysis of the content of the one or more media items 204, and/or other information. By way of non-limiting example, analysis may include one or more of automatic recognition of landmarks and/or other objects in a photograph that may be associated with a particular location, and/or other considerations. Location features may be specific geo-referenced locations such as a pair of latitude and longitude coordinates, a general region such as a city, state, and/or country, a class of locations of which one or more instances exist, and/or other considerations.

In some embodiments, dates and/or times associated with the one or more media items 204 may be determined from information included as metadata associated with the one or more media items 204. Dates and/or times may be determined based on one or more of a creation timestamp, analysis of the content of the one or more media items 204, and/or other considerations. By way of non-limiting example, analysis may include one or more of recognizing and/or detecting time of day based on lighting conditions in a photo and/or video, determining a particular date and/or time at which a photo was taken by recognizing a configuration of objects in the photo and/or video known to have uniquely occurred at a particular date and/or time, and/or other considerations.

In some embodiments, objects, categories, concepts, and/or semantics associated with the one or more media items 204 may be determined from information included as metadata associated with the one or more media items 204. Objects, categories, and/or concepts may be determined based on one or more of user-provided tags, analysis of the content of the one or more media items 204, and/or other considerations. By way of non-limiting example, analysis may include one or more of recognizing objects in a photo based on appearance, identifying concepts related to a photo based on an analysis of objects present in the photo, an arrangement of one or more objects, stylistic properties of a photo, and/or other considerations.

In some embodiments, reason(s) why the one or more media items 204 were created and/or shared may be determined from information included as metadata associated with the one or more media items 204. Reason(s) why the one or more media items 204 were created and/or shared may be determined based on one or more analysis of actions taken by the user involving the one or more media items 204, and/or other considerations. By way of non-limiting example, analysis may include determining whether the one or more media items 204 were posted publicly such as on a web page, social network, and/or broadcast media, transmitted privately to a group of individuals and/or set of computing platforms for a given individual, and/or other considerations.

In some embodiments, a mechanism by which the content was created or used may be determined from information included as metadata associated with the one or more media items 204. These features may be extracted from metadata attached to the one or more media items 204, such as the model of camera used to capture a photo, by analysis of actions the user performed involving the one or more media items 204, the means by which the content may be transmitted, and/or other considerations.

In some embodiments, features and/or information may be extracted from the one or more media items 204. By way of non-limiting example, feature and/or other information extraction may be based on one or more of automatic recognition algorithms such as machine learning systems, software and/or hardware systems such as clocks and/or GPS devices, information generated manually by a user and/or other human labelers, and/or other considerations. In some embodiments, feature and/or other information extraction may be performed in real-time as the one or more media items 204 are obtained. The extracted features and/or other information may be attached to the one or more media items 204 as metadata. The extracted features and/or other information may include information accumulated "offline" and/or from other systems and/or sources.

The one or more media items 204 may be associated 208 (labeled "Grouping" 208 in FIG. 2) with one or more groups based on the obtained 206 information. In some embodiments, the association 208 may be based on the features and/or other information extracted and/or determined in the previous step, and/or other information.

In some embodiments, the one or more processors 201 may be configured to associate 208 the one or more media items 204 with one or more groups based on the obtained 206 information and/or a set of criteria 209. By way of non-limiting example, the criteria 209 may include information indicating how and/or why individual ones of the one or more media items should be grouped with a certain group. A group may correspond to some fixed criteria 209 and/or some dynamically generated criteria 209 based on existing groups, a pool of known dynamic and/or fixed criteria 209, and/or other factors. By way of non-limiting example, given criteria 209 may specify that if a media item includes particular metadata, the media item should be associated with a particular group. By way of non-limiting example, first criteria may be associated with a first group 212, second criteria may be associated with a second group 214, and/or other criteria may be associated with one or more other groups.

In some embodiments, one or more of the one or more media items 204 may be assigned to more than one group. That is to say, association of a given media item with a given group may not preclude its association with any number of other groups. In some embodiments, groups may be associated with one or more electronic storage components which allows for long term information storage. Such information may include a history of one or more media items 204, user viewing history and/or behavior, time delays in one or more media items 204 being viewed by one or more users, and/or other information to be stored in association with a group. In some embodiments, a group may be referred to as a channel, which facilitates routing one or more media items 204 directly to a user and/or computing platform that may be associated with the group. In some embodiments, the channels may or may not require long term information storage, such as information associated with one-time alerts, low priority media items, and/or other considerations. By way of non-limiting example, second group 214 may be associated with first group storage 216.

In some embodiments, a group may be formed based on a set of criteria 209 being defined and/or determined. The criteria 209 may specify metadata and/or other information that media items must match in order to be included in the group. In some examples, criteria 209 may be specified manually, updated dynamically throughout the life of the group, determined automatically by a grouping component 208, and/or other considerations. Criteria 209 may be applied as filters on the obtained 206 information in order to include or discard media items in a group using, for example, any AND, OR, NOT, and/or other combination of suitable syntax. By way of non-limiting example, given criteria 209 may specify "media items having first metadata AND second metadata OR third metadata, but NOT fourth metadata, are to be grouped in GROUP 1." Criteria may be defined in other ways.

In some embodiments, one or more media items may be grouped into a group based on similarity criteria between individual pairs of two or more media items. As such, the generated groups may include media items that may be more similar to one another than to one or more media items outside of the group.

In some embodiments, similarity criteria may be determined based on a scoring function, and/or other information. The inputs of a scoring function may include any and/or all of the information extracted from the individual ones of the one or more media items 204. Output of the scoring function may include a numeric score representing the degree of similarity between at least two of the one or more media items 204.

In some embodiments, a scoring function may include a computation based on a number and/or fraction of matching features and/or other matching information associated with the one or more media items 204, a qualitative comparison of individual features or combinations of features, and/or any combination and/or transformation of values using mathematical functions. Such a similarity computation may be performed automatically by a computer, manually by a person, and/or as a combination of manual and/or automatic steps. By way of non-limiting example, at least two of the one or more media items 204 with high similarity scores may be assigned to the same group, while one or more of the media items 204 with lower similarity scores are may be assigned to different groups.

In some embodiments, similarity may be determined based on transformation of an input of a scoring function into an alternative representation space. The alternative representation space may be configured such that individual features and/or other information associated with the media items may be represented by a collection of values comprising a single point in the new representation space. Distance between one or more media items may be computed by measuring distance between the points in the space using some metric. The metric may include, for example, Euclidian distance between points, and/or other considerations.

In some embodiments, one or more media items 204 may be grouped with other media items based on points represented in the alternative representation space having low distance to one another relative to distances between points representing other media items.

In some embodiments, over time, the one or more media items 204 may change, new media items may be created, and/or the existing one or more media items 204 may be removed. Any of these operations may cause a media item's association with any number of groups to change. Changes may be generated by actions performed by a human user, such as taking a new photo, uploading a new media item to the processor 201, and/or other considerations. Changes may also be generated by computing platforms and/or electronic devices, such as a camera, video recorder, sensor, and/or other device or platform that automatically generates one or more media items either on a recurring basis and/or in response to one or more stimuli. By way of non-limiting example, stimuli may include detection of motion, changes in lighting conditions or new information, and/or other considerations. These changes, regardless of how they are generated, may be detected and/or used to trigger any number of actions.

In some embodiments, triggered actions may include, but are not limited to: automatically generating a notification to one or more users who have indicated interest in a particular media item and/or group; suggesting actions that a user and/computing platform may take with a media items and/or group; generating targeted advertisements based on attributes of a media item and/or group; and/or other considerations.

In some embodiments, automatically generated notifications may be communicated to individual users, group of users, individual computing platforms, groups of computing platforms, and/or other considerations. By way of non-limiting example, the first group 212 may include one or more of the one or more media items 204. The first group 212 may correspond to a group messaging thread where any user (e.g., a user of first source computing platform 202) can be a source for new media items. Media items may be uploaded to the messaging thread and/or transmitted to all other users in the thread. By way of non-limiting example, the second group 214 may include one or more of the one or more media items 204. The second group 214 may be associated with a list of anomalous security camera photos. Any new anomalous photo may trigger an alert sent to a monitoring agency who may be associated with the second group (e.g., the agency may be associated with second end computing platform 220, and/or other considerations).

In some embodiments, suggested actions may include suggestion that a user and/or computing platform share a media item with a set of users and/or computing platforms based on their respective membership in a group of one or more media items that may be frequently shared with the same users and/or computing platforms. In some embodiments, performing such actions may be done automatically by a computing platform on behalf of a user.

In some embodiments, generating targeted advertisements may improve relevance of the advertisements to a user's interest's and/or behavior.

In some embodiments, after grouping, the one or more media items 204 may then be routed 210 (e.g., electronically communicated) to one or more of group storage (e.g., a storage location configured to store one or more media items and/or other information associated with a particular group), one or more users associated with end computing platforms 218, 220, and/or 222 associated with one or more groups 212, 214 with which the one or more media items 204 may be associated, and/or other considerations. To route to an individual user, the router 210 may route a given media item based on the grouping accomplished at 208. By way of non-limiting example, if a user associated with first end computing platform 218 is associated with the first group 212, the router 210 may route one or more of the one or more media items 204 associated with the first group 212 to the first end computing platform 218. In some embodiments, a group (e.g., second group 214) may have multiple members, such as users associated with the second end computing platform 220 and third end computing platform 222. The users at the second end computing platform 220 and/or third end computing platform 222 may or may not be the same set of users who act as sources of the one or more media item 204. By way of non-limiting example, a first user of first source computing platform 202 may contribute media items, while a second user associated with the first end computing platform 218, a third user associated with the second end computing platform 220, and a fourth user associated with the third computing platform 222 may receive one or more of the media items 204 as well as contribute media items. In some embodiments, the status of a computing platform being an "end" or "source" may change depending on the actions of the user.

In some embodiments, routing 210 may be implemented at endpoints (for example, computing platforms such as mobile computing devices and/or desktop computers of users), routing nodes and/or servers in network-based services, internally via one or more processors 201, and/or other considerations. Routing 210 may be layered on top of non-intelligent network equipment to perform the intelligent routing of one or more media items 204 throughout a network.

The following are non-limiting illustrations of embodiments of system 100 (FIG. 1) and/or system 200 (FIG. 2) presented herein. It is noted that these descriptions are provided for illustrative purposes. The various embodiments should not be considered limiting with respect to types of computing platforms and/or related devices, types of media items, and/or the flow of information between various components.

In some embodiments, one or more aspects of a system for facilitating the sharing of digital media items between source computing platforms and end computing platforms based on information associated with the media items may encompass a camera, photo, and/or video organization tool. Such a system may be configured to automatically associate photos/video with one or more particular groups and/or route the photos/videos to one or more users and/or groups of users. By way of non-limiting example, a camera having network capabilities may automatically sends photos of particular children (based on features extracted using face and/or image recognition) to computing platforms associated with family members associated with a group.

In some embodiments, a group may correspond to photos and/or posts of a live event. The photos and/or posts may be obtained and/or associated with the group by "listening" to a public channel (e.g. Twitter) as a source. In some embodiments, one or more photos and/or posts may be automatically selected based on some criteria (e.g., related to the live event, e.g. concert, rally, and/or emergency) using image recognition and/or natural language processing in the feature extraction stage. A triggered action may include one or more of the selected photos and/or posts being republished to another public channel (e.g., another Twitter feed, and/or other considerations).

In some embodiments, a feed of one or more media items generated from a webcam, security cam, drone, and/or satellite may be obtained. Interested users may subscribe to groups that are created based on criteria applied to the feed. The criteria may describe their interests such as content with vehicles in it, suspicious packages, fire, a particular person of interest, and/or other considerations.

In some embodiments, an automated computing platform such as an ad server may add media items to a group based on filter criteria.

In some embodiments, groups may be defined by brand and/or product-based filter criteria. The groups may be used for publishing media items related to the brand and/or product to interested subscribers. By way of non-limiting example, photos of consumers wearing a particular brand of clothing may be published automatically to a group for fans of that brand, and/or other considerations.

It is noted that the depiction in FIG. 2 and accompanying descriptions are not intended to be limiting. Instead, they are provided for illustrative purposes and are not to be considered limiting with respect to media items, item groups, grouping criteria, source computing platforms, end computing platforms, and/or content extraction.

In FIG. 1, the server 102, computing platform(s) 104, and/or external resources 105 may be operatively linked via one or more electronic communication links. For example, such electronic communication links may be established, at least in part, via a communication network 106 such as the Internet and/or other networks. It will be appreciated that this is not intended to be limiting, and that the scope of this disclosure includes embodiments in which server 102, computing platform(s) 104, and/or external resources 105 may be operatively linked via some other communication media.

The external resources 105 may include sources of information, hosts, and/or providers of information outside of system 100, external entities participating with system 100, and/or other resources. In some embodiments, some or all of the functionality attributed herein to external resources 105 may be provided by resources included in system 100 (e.g., in server 102).

The server 102 may include electronic storage 116, one or more processors 118, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102.

Electronic storage 116 may comprise electronic storage media that electronically stores information. The electronic storage media of electronic storage 116 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 116 may include one or more virtual storage resources (e.g., cloud storage, a virtual private network, and/or other virtual storage resources). Electronic storage 116 may store software algorithms, information determined by processor(s) 118, information received from server 102, and/or other information that enables server 102 to function as described herein.

Processor(s) 118 is configured to provide information processing capabilities in server 102. As such, processor 118 may include one or more of a digital processor, an analog processor, a digital circuit designed to process information, an analog circuit designed to process information, a state machine, and/or other mechanisms for electronically processing information. Although processor 118 is shown in FIG. 1 as a single entity, this is for illustrative purposes only. In some embodiments, processor 118 may include one or more components. These components may be physically located within the same device, or processor 118 may represent processing functionality of a plurality of devices operating in coordination. The processor 118 may be configured to execute components 108, 110, 112, and/or 114. Processor 118 may be configured to execute components 108, 110, 112, and/or 114 by software; hardware; firmware; some combination of software, hardware, and/or firmware; and/or other mechanisms for configuring processing capabilities on processor 118.

It should be appreciated that, although components 108, 110, 112, and/or 114 are illustrated in FIG. 1 as being co-located within a single component, in embodiments in which processor 118 includes multiple components, one or more of components 108, 110, 112, and/or 114 may be located remotely from the other components. The description of the functionality provided by the different components 108, 110, 112, and/or 114 described above is for illustrative purposes and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, 114, and/or other components. As another example, processor 118 may be configured to execute one or more additional components that may perform some or all of the functionality attributed below to one of components 108, 110, 112, and/or 114. In some embodiments, one or more feature and/or functions of server 102 may be attributed to one or more computing platforms 104. That is, one or more computing platforms 104 may be configured to carry out one or more features of server 102 herein with or without communication to server 102, and/or other considerations.

Figure 3:
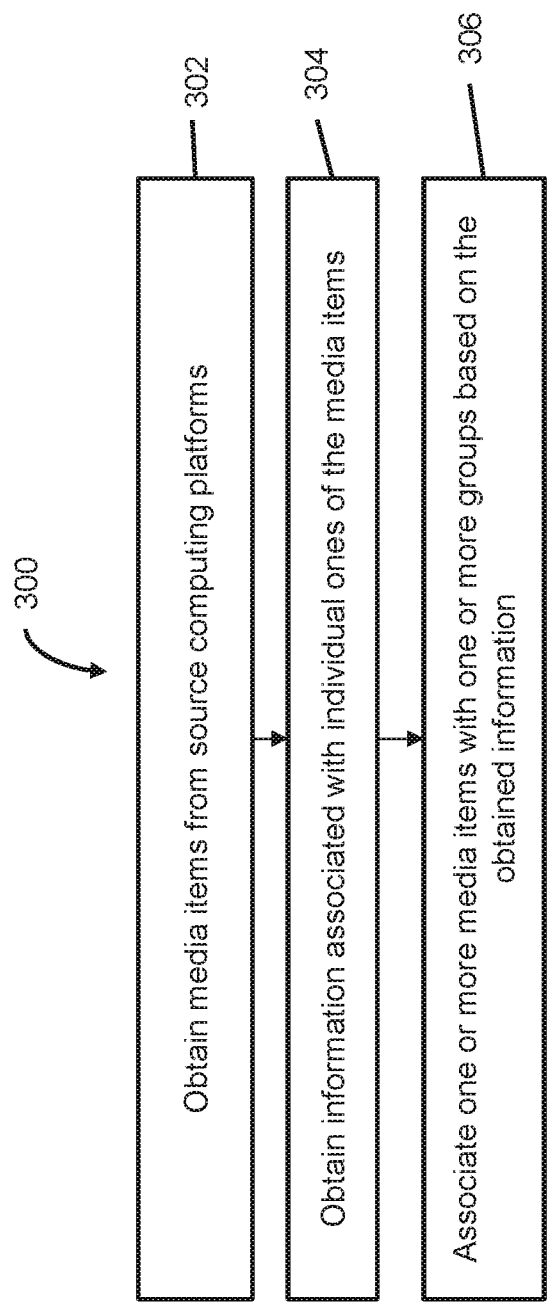
FIG. 3 illustrates a method of communicating digital media items between source computing platforms and end computing platforms based on information associated with the media items, in accordance with one or more embodiments.

FIG. 3 illustrates a method 300 facilitating the communication of digital media items between source computing platforms and end computing platforms based on information associated with the media items. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, a functionally limited processing device, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

Referring now to method 300 in FIG. 3, at an operation 302, one or more media items may be obtained from one or more media item source computing platforms. Individual ones of the media items may comprise one or more of a photo, video, audio, a text, and/or other information. In some embodiments, operation 302 may be performed by a feature extraction component the same as or similar to feature extraction component 110 (shown in FIG. 1 and described herein).

At an operation 304, information associated with an individual one of the media items may be obtained. The information may be obtained from metadata provided with the one or more media items. The information may be obtained by determining and/or extracting information and/or other metadata from the media items. In some embodiments, operation 304 may be performed by a feature extraction component the same as or similar to the feature extraction component 110 (shown in FIG. 1 and described herein).

At an operation 306, one or more media items may be associated with one or more groups based on the obtained information and/or other information. The group associations may be based on grouping criteria. In some embodiments, operation 306 may be performed by a grouping component the same as or similar to the grouping component 112 (shown in FIG. 1 and described herein).

Although the present technology has been described in detail for the purpose of illustration based on what is currently considered to be the most practical and preferred embodiment, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

What is claimed is:

1. A system for facilitating routing of media items between user devices, the system comprising:
   a routing computer system comprising one or more processors programmed with computer program instructions that, when executed, cause the routing computer system to:
   obtain images or videos from one or more sources;
   obtain, from the images or videos, metadata associated with the images or videos;
   perform object recognition on contents of the images or videos to identify individuals or other objects in the images or videos;
   assign first and second images or videos of the images or videos to a first media item group based on (i) the first and second images or videos having similar metadata and (ii) the object recognition identifying an individual or object in the first image or video and an individual or object in the second image or video that are similar to each other;
   automatically transmit the first image or video to one or more user devices of one or more users based on (i) the assignment of the first image or video to the first media item group and (ii) the one or more users being associated with the first media item group, the first image or video being automatically transmitted to the one or more user devices without receiving a user input specifically identifying the first image or video to be provided to the one or more user devices;
   determine a group criteria for the first media item group based on the assignment of the first and second images or videos to the first media item group;
   generate one or more advertisements based on the group criteria;
   assign the one or more advertisements to the first media item group; and
   cause the one or more advertisements to be provided to the one or more user devices of the one or more users based on (i) the assignment of the one or more advertisements to the first media item group and (ii) the one or more users being associated with the first media item group.

2. The system of claim 1, wherein the routing computer system is caused to:
   determine a particular date or time at which a given image or video was taken by recognizing a configuration of objects in the given image or video known to have uniquely occurred at a particular date or time.

3. The system of claim 1, wherein obtaining the images or videos comprises automatically obtaining the first image or video from at least one source of the one or more sources without the at least one source receiving a user input specifically identifying the first image or video to be provided to the routing computer system.

4. The system of claim 1, wherein the one or more sources comprises a user device, and wherein obtaining the images or videos comprises automatically obtaining the first image or video from the user device without the user device receiving a user input specifically identifying the first image or video to be provided to the routing computer system.

5. The system of claim 1, wherein performing object recognition on the contents of the images or videos comprises recognizing faces in the images or videos, and
   wherein assigning the first and second images or videos to the first media item group is based (i) a face in the first image or video being similar to a face in the second image or video and (ii) the metadata associated with the first image or video being similar to the metadata associated with the second image or video.

6. The system of claim 1, wherein the routing computer system is caused to:
   detect motion or a change in lighting conditions in the first image or video; and
   generate one or more suggested actions to be taken by the one or more users based on the detected motion or change in lighting conditions in the first image or video.

7. The system of claim 6, wherein the routing computer system is caused to:
   detect motion in the second image or video; and
   generate one or more additional suggested actions to be taken by a user based on the detected motion in the second image or video.

8. The system of claim 6, wherein the routing computer system is caused to:
   detect a change in lighting conditions in the second image or video; and
   generate one or more additional suggested actions to be taken by a user based on the detected change in lighting conditions in the second image or video.

9. A method for facilitating routing of media items between user devices, the method being implemented by a routing computer system comprising one or more processor executing computer program instructions that, when executed, perform the method, the method comprising:
   obtaining images or videos from one or more sources;
   performing object recognition on contents of the images or videos to identify individuals or other objects in the images or videos;
   assigning first and second images or videos of the images or videos to a first media item group based on (i) the first and second images or videos having similar metadata and (ii) the object recognition identifying an individual or object in the first image or video and an individual or object in the second image or video that are similar to each other;
   automatically transmit the first image or video to one or more user devices of one or more users based on (i) the assignment of the first image or video to the first media item group and (ii) the one or more users being associated with the first media item group, the first image or video being automatically transmitted to the one or more user devices without receiving a user input specifically identifying the first image or video to be provided to the one or more user devices;
   determining a group criteria for the first media item group based on the assignment of the first and second images or videos to the first media item group;
   generating one or more advertisements based on the group criteria;

assigning the one or more advertisements to the first media item group; and causing the one or more advertisements to be provided to the one or more user devices of the one or more users based on (i) the assignment of the one or more advertisements to the first media item group and (ii) the one or more users being associated with the first media item group.

10. The method of claim 9, further comprising:

determining a particular date or time at which a given image or video was taken by recognizing a configuration of objects in the given image or video known to have uniquely occurred at a particular date or time.

11. The method of claim 9, wherein obtaining the images or videos comprises automatically obtaining the first image or video from at least one source of the one or more sources without the at least one source receiving a user input specifically identifying the first image or video to be provided to the routing computer system.

12. The method of claim 9, wherein the one or more sources comprises a user device, and wherein obtaining the images or videos comprises automatically obtaining the first image or video from the user device without the user device receiving a user input specifically identifying the first image or video to be provided to the routing computer system.

13. The method of claim 9, wherein performing object recognition on the contents of the images or videos comprises recognizing faces in the images or videos, and wherein assigning the first and second images or videos to the first media item group is based (i) a face in the first image or video being similar to a face in the second image or video and (ii) the metadata associated with the first image or video being similar to the metadata associated with the second image or video.

14. The method of claim 9, further comprising:

detecting motion or a change in lighting conditions in the first image or video; and generating one or more suggested actions to be taken by the one or more users based on the detected motion or change in lighting conditions in the first image or video.

15. A system for facilitating routing of media items between user devices, the system comprising:

a routing computer system comprising one or more processors programmed with computer program instructions that, when executed, cause the routing computer system to:

automatically obtain images or videos from one or more sources without the one or more sources receiving a user input specifically identifying the images or videos to be provided to the routing computer system;

perform object recognition on contents of the images or videos to identify individuals or other objects in the images or videos;

assign first and second images or videos of the images or videos to a first media item group based on (i) the first and second images or videos having similar metadata and (ii) the object recognition identifying an individual or object in the first image or video and an individual or object in the second image or video that are similar to each other;

automatically transmit the first image or video to one or more user devices of one or more users based on (i) the assignment of the first image or video to the first media item group and (ii) the one or more users being associated with the first media item group, the first image or video being automatically transmitted to the one or more user devices without receiving a user input specifically identifying the first image or video to be provided to the one or more user devices;

determine a group criteria for the first media item group based on the assignment of the first and second images or videos to the first media item group;

generate one or more advertisements based on the group criteria;

assign the one or more advertisements to the first media item group; and cause the one or more advertisements to be provided to the one or more user devices of the one or more users based on (i) the assignment of the one or more advertisements to the first media item group and (ii) the one or more users being associated with the first media item group.

16. The system of claim 15, wherein the routing computer system is caused to:

determine a particular date or time at which a given image or video was taken by recognizing a configuration of objects in the given image or video known to have uniquely occurred at a particular date or time.

17. The system of claim 15, wherein performing object recognition on the contents of the images or videos comprises recognizing faces in the images or videos, and wherein assigning the first and second images or videos to the first media item group is based (i) a face in the first image or video being similar to a face in the second image or video and (ii) the metadata associated with the first image or video being similar to the metadata associated with the second image or video.

18. The system of claim 15, wherein the routing computer system is caused to:

detect motion or a change in lighting conditions in the first image or video; and generate one or more suggested actions to be taken by the one or more users based on the detected motion or change in lighting conditions in the first image or video.

* * * * *